United States Patent [19]

Penman

[11] Patent Number: 4,733,814

[45] Date of Patent: Mar. 29, 1988

[54] FRICTION WELDING APPARATUS

[76] Inventor: Robert D. Penman, 15 Steeple Close, West Canford Heath, Poole, Dorset BH17 9BJ, England

[21] Appl. No.: 923,839

[22] PCT Filed: Feb. 28, 1986

[86] PCT No.: PCT/GB86/00107
§ 371 Date: Oct. 28, 1986
§ 102(e) Date: Oct. 28, 1986

[87] PCT Pub. No.: WO86/05134
PCT Pub. Date: Sep. 12, 1986

[30] Foreign Application Priority Data

Mar. 2, 1985 [GB] United Kingdom ............... 8505401

[51] Int. Cl.$^4$ ............................................ B23K 20/12
[52] U.S. Cl. ........................................... 228/2; 228/48; 228/112
[58] Field of Search ............... 228/2, 112, 113, 212, 228/48

[56] References Cited

U.S. PATENT DOCUMENTS

| 3,745,641 | 7/1973 | Paolini | 228/2 |
| 3,753,820 | 8/1973 | Ishikawa et al. | 228/2 |
| 3,800,995 | 4/1974 | Franks et al. | 228/2 |
| 3,954,215 | 5/1976 | Takagi et al. | 228/2 |
| 4,030,658 | 6/1977 | Parrish | 228/2 |
| 4,414,046 | 11/1983 | Palmer | 228/2 |
| 4,552,609 | 11/1985 | Larsen | 228/2 |

FOREIGN PATENT DOCUMENTS

| 3307445 | 9/1984 | Fed. Rep. of Germany | 228/112 |
| 45791 | 12/1978 | Japan | 228/2 |

Primary Examiner—Nicholas P. Godici
Assistant Examiner—Samuel M. Heinrich
Attorney, Agent, or Firm—Marshall, O'Toole, Gerstein, Murray & Bicknell

[57] ABSTRACT

A friction welding machine, for welding two members such as universal joint parts to the ends of a central component such as a tubular shaft, wherein rotatable holders (20) for the members are connected to a layshift (22) which is arranged to be driven and braked at a generally central position. The arrangement facilitates rapid braking necessary for establishing welds between aluminum alloy parts.

4 Claims, 3 Drawing Figures

FRICTION WELDING APPARATUS

This invention relates to apparatus for simultaneously friction welding two members to the ends of an intermediate component, with the members in a required angular orientation relative to one another about a common longitudinally extending axis.

The apparatus according to the invention has been developed in relation to the manufacture on transmission shaft elements for motor vehicles. A typical shaft element required to be manufactured has the central component in the form of a tubular shaft component, with the members at the ends thereof taking the form of universal joint parts, or one member may be a universal joint part and the other a splined element which forms part of a sliding splined connection to enable length variations in the transmission shaft to occur in service. A typical universal joint part is the yoke of a Hookes universal joint. In a Hookes jointed shaft, the joint yokes have to be accurately angularly aligned with one another about the axis of the shaft, in order to avoid unbalance and vibration problems in use.

Further, the apparatus according to the invention has been developed with the object of being capable of welding transmission shafts whose parts are made of aluminium alloys. Friction welding of such materials is difficult, primarily because of the high thermal conductivity thereof which means that, after the parts to be welded have been brought to a welding temperature in the well known first or "burn-off" stage of the welding operation, relative movement between the parts must be halted and a welding force applied therebetween very quickly. Welding conditions are sustained at the interface between the parts for a relatively short time, and if the relative motion is not completely arrested within such a short time poor welds result. The effect may be regarded as being analogous to the formation and tearing apart of a succession of welds during the braking time, if the braking time is too long. Braking times of the order of tens of milliseconds are required.

Although machines capable of friction welding transmission shaft elements of steel are well known, it has hitherto been difficult reliably to manufacture such shaft elements of aluminum alloy, because of the problems above referred to. It is the object of the present invention to provide apparatus which enables such problems to be overcome or reduced.

According to the invention, we provide apparatus for simultaneously friction welding two members to the ends of an intermediate component, in a required angular orientation relative to one another about a common longitudinally extending axis, comprising:

a bed;

means for holding said intermediate component stationary relative to said bed;

two head assemblies, each adapted to be fixed relative to said bed and comprising a holder for a respective one of said members, bearing means supporting said holder for rotation about said axis, and means for applying a force along said axis to said holder so that said member is brought into engagement with said intermediate component under said force;

a lay shaft supported for rotation about its axis, extending lengthways of said bed;

transmission means connecting each of said holders with said lay shaft, and establishing a positive connection therebetween so that said holders remain in a fixed angular orientation relative to one another about said axis;

means for driving said lay shaft, and means for braking said lay shaft, said means for braking said lay shaft acting thereon substantially at the centre thereof, equidistant between said transmission means.

In a friction welding machine, stopping the relative rotation between the parts to be welded is, in essence, merely a matter of providing a sufficiently powerful brake. However, such rapid braking can cause problems because of "wind-up" in the rotating components of the machine, due to the inertia of the parts which have to be braked. In the apparatus according to the invention, by braking the lay shaft, and thus the holders of the two members to be welded by way of the transmission means, by a braking means acting substantially at the centre of the lay shaft between said transmission means, ensures that any wind-up affecting the two holders is equalised. Thus, under the conditions of rapid braking necessary for reliable welding of aluminium alloy parts, the required alignment is maintained. Further, it is ensured that the two holders are braked exactly simultaneously, which may not be the case if the holders were braked by separate brakes associated therewith even if such brakes were controlled from a common source. This provides consistant quality at both welds.

The braking means may be, as is generally known for friction welding machines, a disc brake assembly operated by fluid pressure. To assist rapid braking, such braking means may be brought into operation by fluid pressure derived from an accumulator, under the control of a suitable valve. By use of an accumulator, the brake can be actuated more quickly than if its source of, e.g., hydraulic fluid under pressure were a pump directly.

A further aspect of braking performance is that rapid braking is assisted if the inertia of the rotating parts is kept as low as possible. One area in which such inertia can be reduced is that of the holders for the two members which are to be welded to the intermediate component, where conventional chucks can have an undesirably high mass and thus inertia.

The present invention therefore provides that at least one of said holders may have jaws arranged to be brought into gripping engagement with the member by displacement of a wedge element within the holder. Such displacement of the wedge element is affected by means external to the holder and not rotating therewith. Thus the holder inertia can be kept to a minimum.

These and other features of the invention will now be described by way of example with reference to the accompanying drawings, of which:

Figure 1:
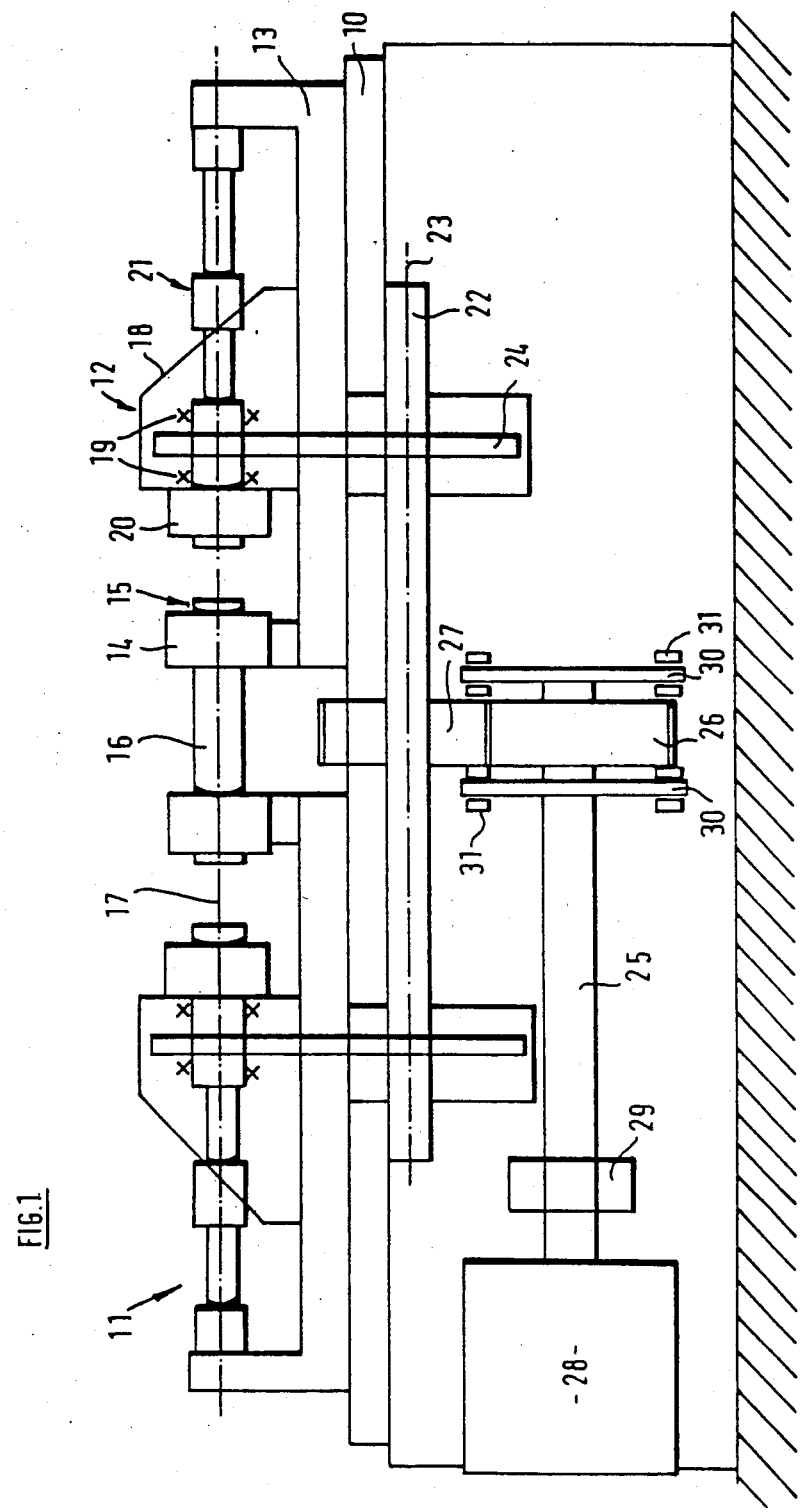
FIG. 1 is a diagrammatic elevation showing the general arrangement of apparatus according to the invention.

Referring firstly to FIG. 1 of the drawings, there is illustrated an apparatus comprising a bed 10 which supports, for longitudinal movement thereon, two carriage assemblies 11, 12. The carriage assemblies are capable of being fixed in the desired positions on the bed 10, and preferably such fixing is effected by a mechanism which includes a braking element extending longitudinally of the carriage and arranged to be brought into engagement with a suitable surface on the bed so that the carriage is held by friction. The element on the carriage may include a lining of a friction material, and may be brought into engagement with the bed by means of a wedge element movable longitudinally of the carriage by fluid pressure means. Such a manner of adjustment of the distance between the carriages enables the apparatus to be set up rapidly when shafts of different length are to be welded.

The carriages 11, 12 are mirror-image identical to one another and therefore only one will be described in detail. It comprises a base 13 having at one end an upstanding structure 14 which is provided with a clamp of conventional type for holding stationary one end 15 of the intermediate component 16 at whose ends members are to be welded. The other end of the component 16 is held by a corresponding clamp associated with the other carriage 11. The longitudinal central axis of the component 16 is indicated at 17. A head 18 is carried by the carriage 13, and this supports in bearings 19, for rotation about the axis 17, a holder 20 for the member to be welded to the end 15 of the component 16. The holder 20 is also supported in the head 18 for movement along the axis 17, and there is provided an hydraulic piston and cylinder arrangement 21 for applying an axially directed force to the holder 20 to effect such movement thereof. Arrangements of parts such as bearings 19 for supporting the holder 10, and piston and cylinder arrangement 21 for applying an axially directed force thereto, are generally known and are not therefore described here in detail. It will be appreciated that the holders 20 may be of different design according to the type of member to be held thereby.

A lay shaft 22 extends longitudinally of the apparatus and is mounted by suitable bearings, not shown, for rotation about an axis 23. The holder 20 is drivably connected to the lay shaft 22 by a transmisson means in the form of a gear train 24. A ball spline arrangement is used at the connection between the lay shaft 22 and the gear of the gear train which is connected thereto, to provide for the movement of the holder 20 lengthwise of the lay shaft. Because of such connection by gear trains, the orientation of the two holders of the machine is fixed relative to one another about the axis 17.

At its centre, the lay shaft 22 is drivingly connected to a drive shaft 25 by way of gears 26, 27. The drive shaft 25 is drivable from a motor 28 by way of a clutch 29. Brake discs 30 are provided at the sides of gear 26, to be engaged by brake calipers 31. The calipers would be actuated to brake the drive shaft 25 and gear 26, and thus the lay shaft and holders of the machine, by fluid pressure, e g. from a hydraulic accumulator by way of a suitable control valve in known manner.

In use of the machine, the carriages 11, 12 would be fixed in positions on the bed of the machine to suit the length of the component 16. The members to be welded to the ends thereto would be placed in the holders of the head assemblies. The component 16 may be centralised in the machine by causing the members to be welded thereto to abut the ends thereof, before the clamps holding the component 16 are tightened. Thereafter, with clutch 29 engaged, the holders are rotated by the operation of motor 28, and a suitable force applied to the holders so that the members held thereby engage the ends of components 16 until welding conditions are established at the interfaces. When such conditions exist, clutch 29 is disengaged (to remove the inertia of motor 28 from the rotating assembly), and the brakes applied to bring the rotating parts rapidly to a halt. Application of suitable welding pressure to the holders completes the welding process. The sequence of operations involved in the complete welding cycle preferably is rendered automatic or semi-automatic by use of a suitable control system. There are many known types of control system suitable for use with machines of this type, and thus one will not be described in detail herein.

Figure 2:
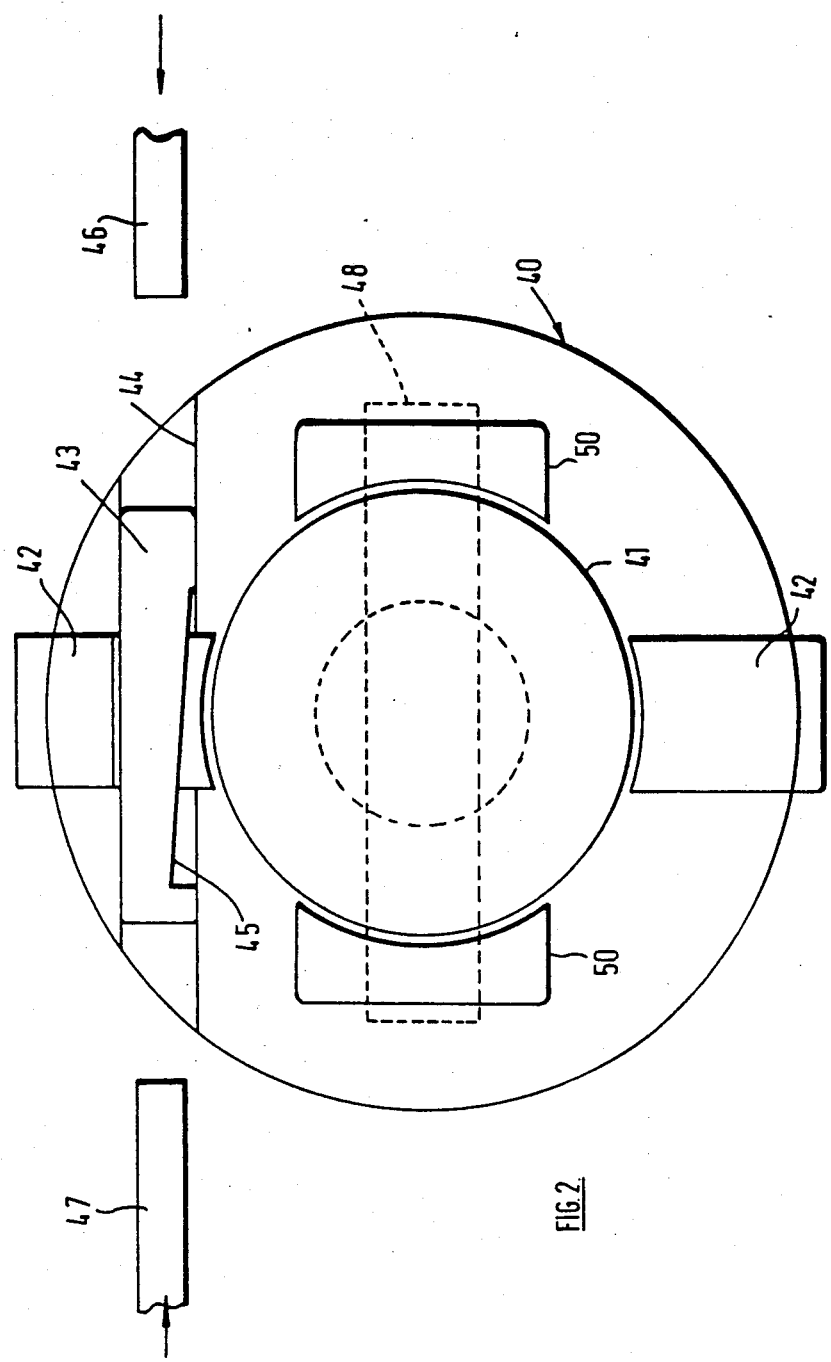
FIG. 2 is a diagram showing the principle of operation of one of the holder assemblies of the apparatus.
Figure 3:
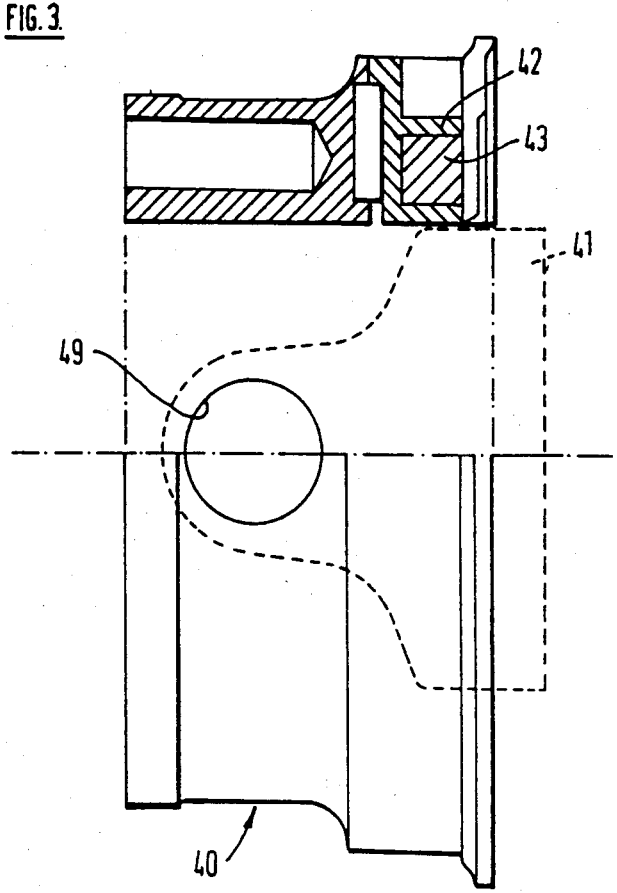
FIG. 3 is an elevation, partly in section, of the holder assembly of FIG. 2

It will be appreciated in this operation that the symmetry of the machine about the central gear drive 26, 27 to the lay shaft 22 ensures that any "wind-up" in the lay shaft and the gear drive trains to the rotating holders of the machine will be substantially equal. Such wind-up can be an appreciable problem during the very rapid braking necessary when welding aluminium alloy shaft parts. During formation of the welds at the ends of the central component, the shear strains are equal, and residual stresses minimised after the welds have been completed. The braking effectiveness of the apparatus is also assisted by the inertia of the rotating component thereof being kept as low as possible, and one manner in which this can be achieved in respect of the holders 20 will now be described with reference to FIGS. 2 and 3 of the drawings.

In these Figures, the holder is indicated at 40, and is adapted to receive a yoke member 41 of a Hookes universal joint, shown in outline only. Two diametrically opposed jaws 42 engage a cylindrical body part of the yoke member 41, which jaws are movable radially in passages in the holder 40. Wedge members 43, of which only one is illustrated, are movable in respective passages 44 extending chordally of the holder 40, and these wedge members have inclined wedge surfaces as 45 engaging corresponding inclined surfaces in the jaws 42. Thus, movement from right to left of the wedge member 43 shown in the upper half of FIG. 2, will effect radially inward movement of the jaw 42 to grip the joint yoke member 41. The position of the wedge member 43 is maintained by friction after it has been moved to engage the jaw with the yoke member, such movement being effected by a pusher member 46 which forms part of the welding apparatus but does not rotate with the holder 40. An opposed pusher 47 provides for movement of the wedge member 43 in the opposite direction when jaw 42 is to be released from the yoke member. The pushers 46, 47 may be actuated by hydraulic cylinders mounted on the respective carriage assembly 11, 12 having the holder 40 in question.

The desired alignment of the yoke member in the holder 40 is maintained by a bar 48 which is passed through apertures 49 in the spaced parallel limbs of the yoke member 41, and engages formations in parts 50 of the holder. The bar may also provide for application of driving torque to the yoke member 41, so that the jaws 42 do not have to grip the yoke member as tightly as would be necessary if they were also transmitting torque thereto. Bar 48 may be movable by an hydraulic cylinder or cylinders, in manner analogous to the pushers 46, 47.

It will be appreciated that the holders, by virtue of the use of externally operated wedge members to cause their jaws to grip the members held thereby, achieve an appreciable saving in weight and hence rotary inertia as compared with conventional chucks, thereby assisting the apparatus to be braked rapidly enough to enable it satisfactorily to weld aluminium alloy components.

I claim:

1. Apparatus for simultaneously friction welding two members to the ends of an intermediate component (16), in the required angular orientation relative to one another about a common longitudinally extending axis (17), comprising:

a bed (10);

means (14) for holding said intermediate component (16) stationary relative to said bed;

two head assemblies (11, 12), each adapted to be fixed relative to said bed and comprising a holder (20, 40) for a respective one of said members, bearing means (19) supporting said holder for rotation about said axis, and means (21) for applying a force along said axis to said holder (20, 40) so that said member is brought into engagement with said intermediate component under said force;

a lay shaft (22) supported for rotation about its axis (23), extending lengthways of said bed;

transmission means (24) connecting each of said holders with said lay shaft, and establishing a positive connection therebetween so that said holders remain in a fixed angular orientation relative to one another about said axis (17);

means (28, 25, 26, 27, 29) for driving said lay shaft, and means (30, 31) for braking said lay shaft, said means for braking said lay shaft (22) acting thereon substantially at the centre thereof, equidistant between said transmission means (24).

2. Apparatus according to claim 1 wherein at least one of said holders (40) has a body, at least one jaw (42) movable radially in the body, and a wedge element mounted by the body and movable chordally to cooperate with and move the jaw.

3. Apparatus according to claim 2 wherein said displacement of the wedge element (43) is effected by means (46, 47) external to the holder (40) and not rotating therewith.

4. Apparatus according to claim 1 in which at least one of said holders (20,40) has a body, recess means in the body for receiving limbs of a Hookes universal joint yoke (41), and a bar to pass through apertures in the yoke member limbs and to cooperate with the body to hold the yoke member in alignment.

* * * * *

UNITED STATES PATENT AND TRADEMARK OFFICE
CERTIFICATE OF CORRECTION

PATENT NO. : 4,733,814

DATED : March 29, 1988

INVENTOR(S) : Robert Donald Penman

It is certified that error appears in the above-identified patent and that said Letters Patent is hereby corrected as shown below:

Front page, after the third line of data element identifier "[86]" insert -- This application filed under CFR 1.47(b) --.

Signed and Sealed this

Twenty-second Day of November, 1988

Attest:

DONALD J. QUIGG

*Attesting Officer*  *Commissioner of Patents and Trademarks*